United States Patent [19]

Jackson

[11] Patent Number: 4,874,351
[45] Date of Patent: Oct. 17, 1989

[54] CONTINUOUSLY VARIABLE BELT-DRIVE TRANSMISSION

[76] Inventor: Patrick Jackson, 240 Ayer Rd., Williamsville, N.Y. 14221

[21] Appl. No.: 266,165

[22] Filed: Nov. 2, 1988

[51] Int. Cl.[4] .............................................. F16H 55/54
[52] U.S. Cl. ......................................... 474/49; 474/53
[58] Field of Search .................................... 474/47–50, 474/52–57; 74/866, 856, 865

[56] References Cited

U.S. PATENT DOCUMENTS

| | | | |
|---|---|---|---|
| 4,068,539 | 1/1978 | Nyc | 474/53 |
| 4,295,836 | 10/1981 | Kumm | 474/53 X |
| 4,409,862 | 10/1983 | Adkins | 474/53 X |
| 4,501,574 | 2/1985 | Miro | 474/49 |
| 4,759,739 | 7/1988 | Weir | 474/49 |

Primary Examiner—Thuy M. Bui
Attorney, Agent, or Firm—Christel, Bean & Linihan

[57] ABSTRACT

A continuously variable belt-drive transmission of the type having spaced apart sheaves each provided with a plurality of sheave segments which may be moved radially inwardly and outwardly. A novel control is provided for selectively moving the segments inwardly or outwardly while the sheaves are rotating, the control including a motor carried by the body of each of the sheaves, the motor being operatively interconnected with the associated sheave segments. Power is transmitted to the motor by electrical wires, slip rings and brushes.

8 Claims, 2 Drawing Sheets

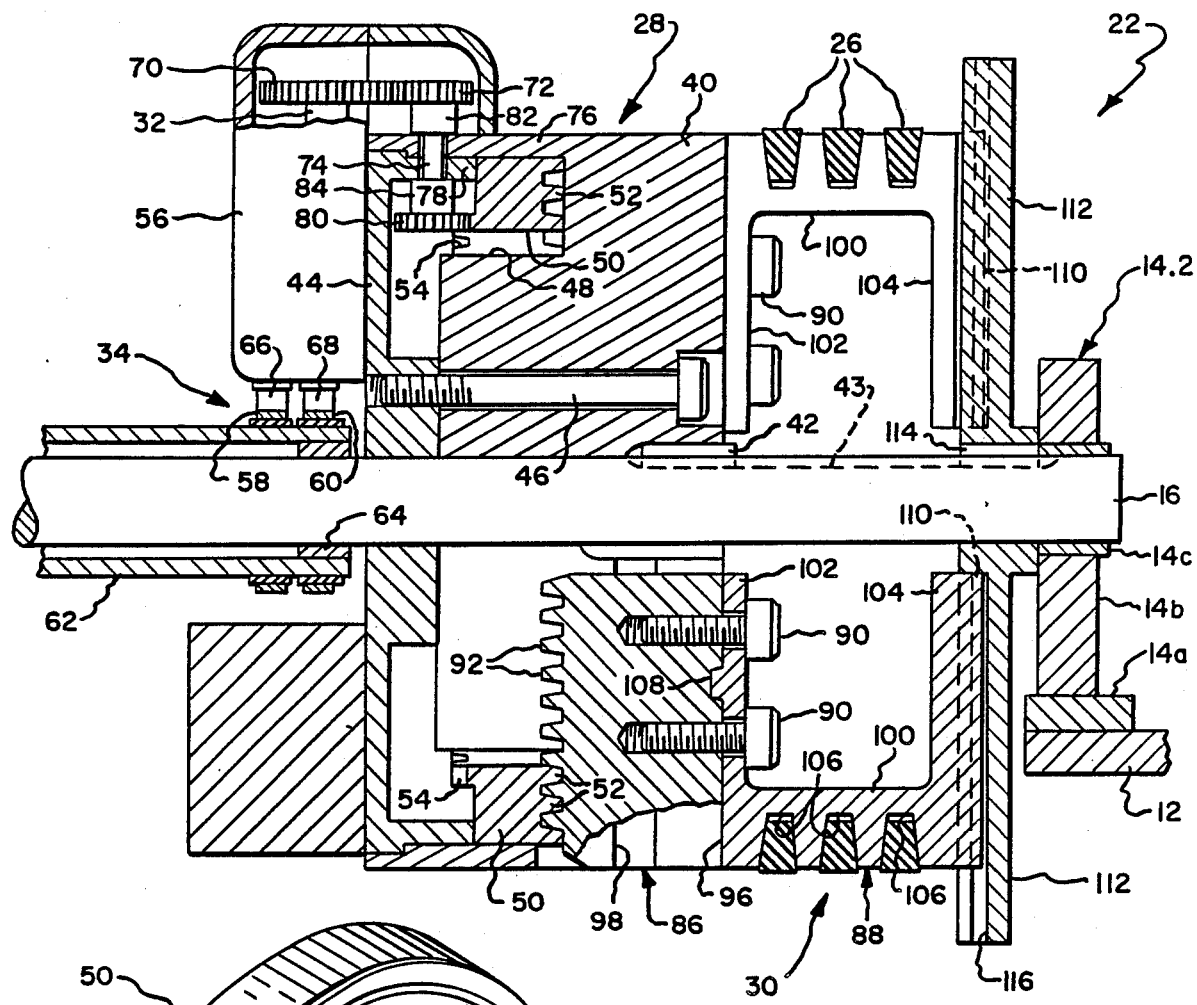
Fig. 3.
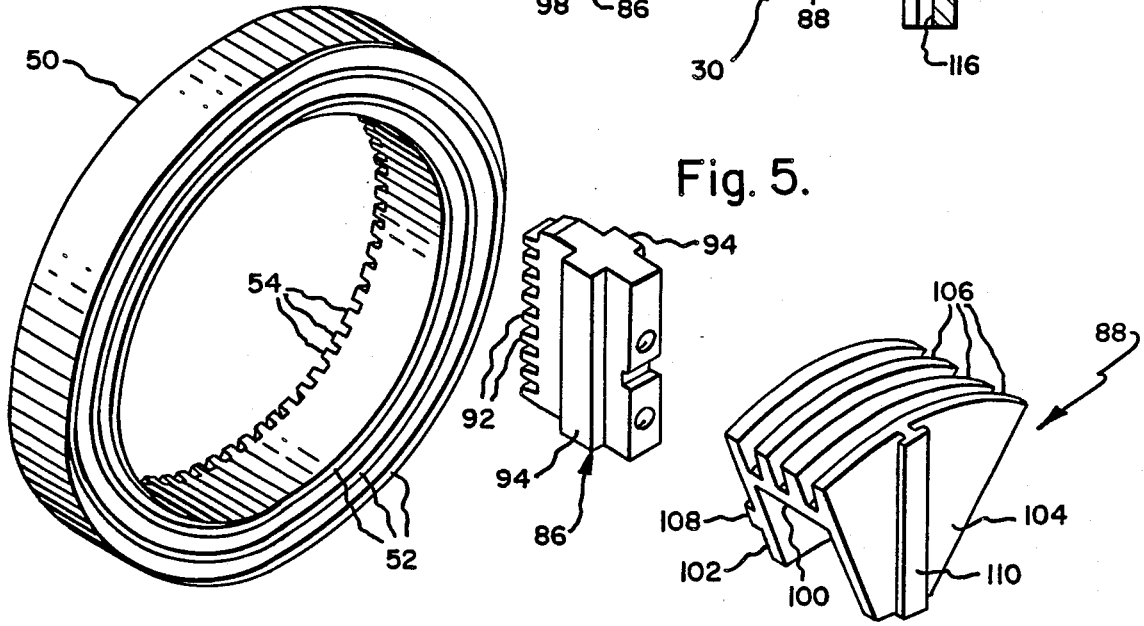
Fig. 4.
Fig. 5.
Fig. 6.

CONTINUOUSLY VARIABLE BELT-DRIVE TRANSMISSION

FIELD OF THE INVENTION

The present invention relates generally to continuously variable belt-drive transmissions, and more particularly to a continuously variable endless belt power transmission system of the type wherein the effective diameter of the sheaves which the belt(s) pass over are simultaneously adjusted.

BACKGROUND OF THE INVENTION

Transmissions of many differing types are well known in the art. Ideally, in a motor vehicle, the transmission should provide stepless adjustment from zero to maximum ground speed, should be easy for the operator to adjust - or even automatic in its performance, should not cause any power loss, and should be low in first cost. Unfortunately, these desired characteristics are not all obtainable and thus no manufacturer can ever introduce the perfect transmission. A continuously variable belt-drive transmission has been used in the past. In one form the effective diameter of one sheave is varied while the other sheave, which is spring loaded to its largest effective diameter position, may have its effective diameter changed by the tension of the belt reacting against the springs. The primary adjustable sheave is typically adjusted by movement of a single side of the sheave. This form of continuously variable belt-drive transmission has the disadvantage in that only a single belt can be utilized in the transmission, which single belt may not be suitable for transmitting the power requirements necessary for many of today's vehicles. U.S. Pat. No. 4,409,862 shows a multi-belt split drive transmission wherein the belts of the drive and driven sheaves of the variable speed portion are both supported by sheave segments, which segments are moved radially inwardly or outwardly by opposed scrolls disposed within the housing that supports the sheave segments, the scrolls in turn being caused to be rotated relative to the housing by a gear train which is interconnected to electrically operated actuators disposed at a location to one side of the transmission. While the design of the above patent overcomes some of the problems and disadvantages of the prior art, this design is relatively expensive due to the utilization of complex gear trains and opposed scrolls.

OBJECTS AND SUMMARY OF THE PRESENT INVENTION

It is an object of the present invention to provide a continuously variable belt-drive transmission which is capable of transmitting relatively high torques, the belt-drive transmission being of reasonably low cost, and which is easy to adjust when in operation.

If such a transmission is utilized in a heavily loaded tractor trailer it is believed that it will lower driver fatique as all shifting will be easily accomplished by electrical control means, thus not requiring double clutching and movement of shift levers. It is also believed that such a transmission can be utilized to either obtain the highest possible speeds in hilly terrain or the most fuel efficient operation in relatively flat terrain. Thus, in hilly terrain the engine can be set to its highest torque performance when going up a hill and by properly adjusting the transmission of this invention to maintain desired engine rpm for maximum torque the greatest possible speed will be maintained when going up the hill. To achieve the most fuel efficient operation the engine is set to its most fuel efficient speed and the transmission is adjusted to the desired output speed.

The foregoing is achieved by mounting a control motor, which is preferably a stepping electric motor, on the rotating body of the sheave and coupling the output shaft of the motor with a scroll mounted within one side of the sheave, which scroll when rotated relative to the sheave causes the effective diameter of the sheave to be incrased or decreased. The electric motor is in turn interconnected with controls and a souce of power by means of commutator rings.

The foregoing will be understood more completely after a consideration of the following detailed description taken in conjunction with the accompanying drawings in which a preferred form of this invention is illustrated.

DESCRIPTION OF THE FIGURES

FIG. 3 is a sectional view taken generally along the line 3—3 of FIG. 2.

FIGS. 4, 5 and 6 are isometric views of various elements of the transmission.

DETAILED DESCRIPTION

Figure 1:
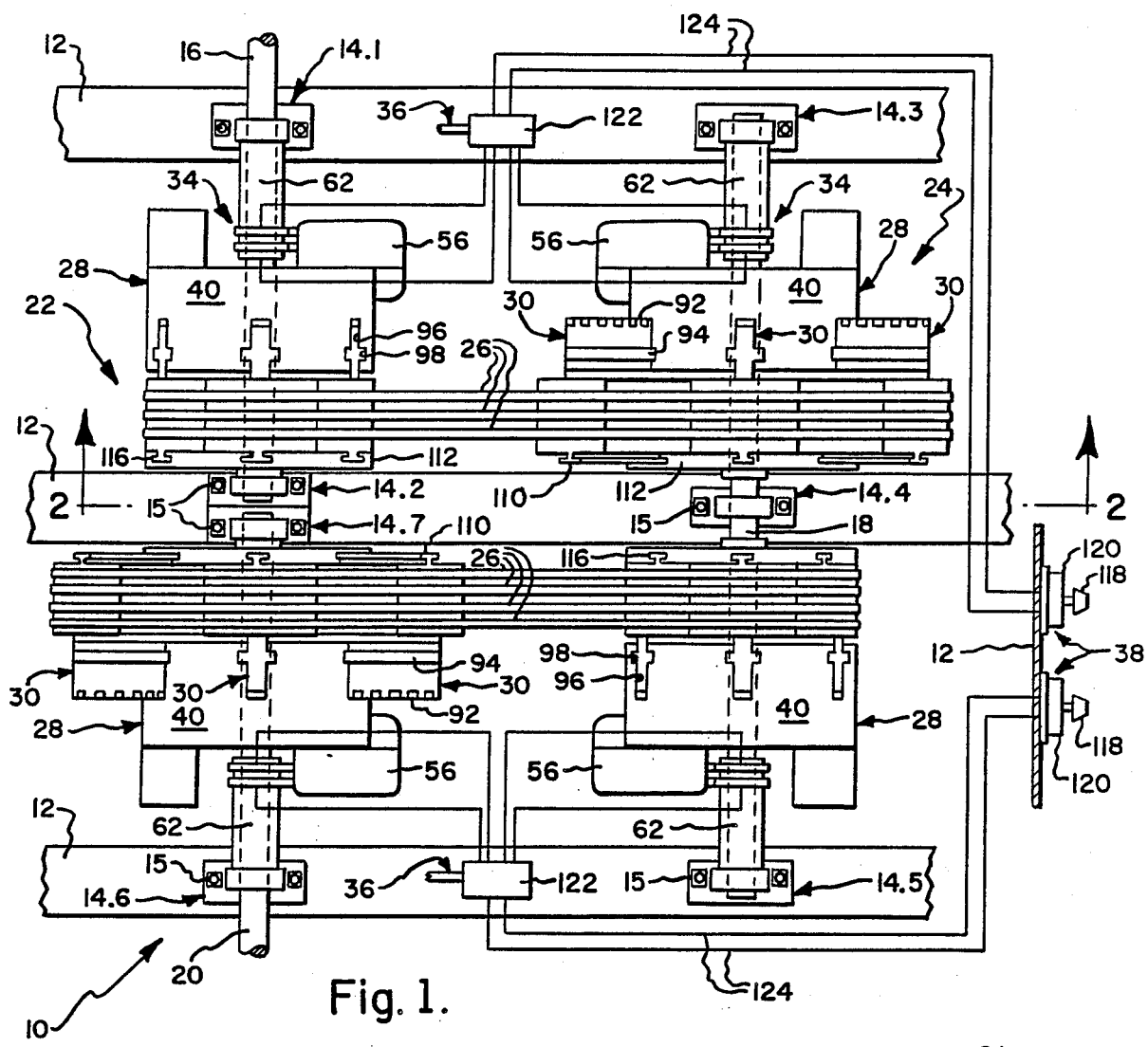
FIG. 1 is a plan view of an illustrative embodiment of the continuously variable belt drive transmission of this invention.
Figure 2:
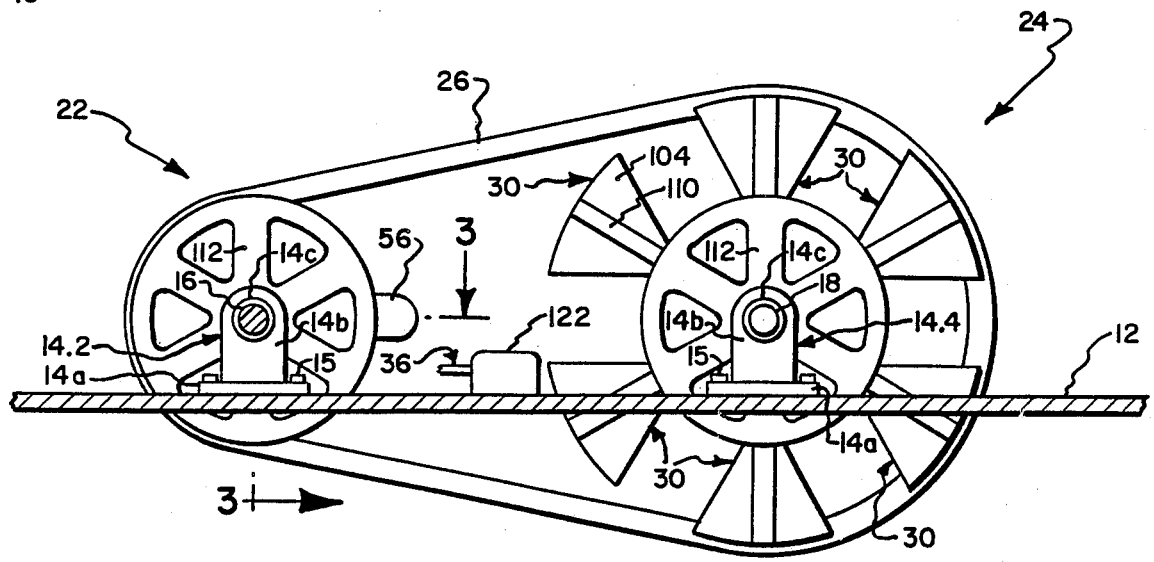
FIG. 2 is a sectional view taken generally along the line 2—2 of FIG. 1.

Referring first to FIG. 1, the continuously variable belt drive transmission of this invention is indicated generally at 10. The transmission includes a support 12 upon which are mounted bearing blocks 14.1 to 14.7. As best shown in FIGS. 2 and 3 each bearing block includes a flange 14a, an upright portion 14b and a bearing 14c. The bearing blocks 14 are mounted on frame 12 by fasteners 15. Journalled within the bearings 14c of the various bearing blocks are a plurality of shafts. Thus, journalled in bearing blocks 14.1 and 14.2 is an input or first shaft 16. An intermediate of second shaft 18 has an intermediate portion supported by bearing block 14.4 and ends supported by bearing blocks 14.3 and 14.5. Finally, an output or third shaft 20 is supported by bearing blocks 14.6 and 14.7.

At this point it should be noted that the continuously variable belt drive transmission of this invention as shown in FIG. 1 is shown as a multi-stage transmission. Thus, the speed of intermediate shaft 18 may be varied with respect to input shaft 16, and similarly, the speed of output shaft 20 may be varied with respect to intermediate shaft 18. While a two stage transmission is shown in FIG. 1, it should be appreciated that any number of stages may be utilized to produce the desired result. Thus, a single stage may be utilized if it is only necessary to vary the input/output ratio by a factor equal to or less than that available from the single stage, the ratio factor hereinafter being referred to as X. Alternatively, if it is necessary to vary the input/output ratio by a factor more than X, but less than $X^2$, then two stages may be employed. Similarly, if it is necessary to vary the input/output ratio by a factor of greater than $X^2$ but less than $X^3$ a three stage transmission may be employed. Since all of the stages are essentially the same in the following description only the single stage shown in FIG. 2 will be described in detail.

Mounted on the first and second shafts 16, 18, are first and second substantially identical adjustable sheaves 22, 24, respectively, the sheaves being in parallel alignment with each other. One or more power transmitting belts 26 transmit the power from the first sheave 22 to the second sheave 24. Each of the adjustable sheaves 22, 24 includes a body 28 secured to the associated shaft for rotation therewith and a plurality of sheave segments 30 mounted on the body for radial inward and outward movement. If the sheave segments 30 are all disposed inwardly as shown on the first adjustable sheave 22 and similarly, if the sheave segments on the second adjustable sheave 24 are all disposed outwardly, the second shaft 18 will be caused to be rotated at a slower speed than that of the first shaft 16. Similarly, if the diameter of the first adjustable sheave 22 were incrementally expanded and the diameter of the second adjustable sheave 24 were correspondingly incrementally reduced by moving the sheave segments 30 inwardly, the output speed of the shafts could be varied. Thus, if the diameters of the sheaves 22, 24 were equal the output shaft 18 would have the same speed as input shaft 16. Similarly, if the diameter of sheave 22 were greater than the diameter of sheave 24 the scond shaft 18 would have a faster rotational speed than the first shaft 16.

In order to provide for the adjustment of the sheaves 22, 24, control means are provided which are capable of adjusting the effective diameter of both sheaves 22, 24 simultaneously by selectively radially moving the sheave segments 30 either inwardly or outwardly while the associated body 28 is rotating with its associated shaft. The control means include motor means 32 carried by the body of each of the first and second sheaves, power transmitting means indicated generally at 34, the power transmitting means extending to the motor means about a portion of each of the shafts from a source of power 36 external of the transmission, and operator control means 38 which are capable of causing the motor means to be operated in the proper manner.

Referring now in detail to FIGS. 3 through 6, the body 28 of an adjustable sheave includes a main body portion 40 which is secured to an associated shaft for rotation therewith by key 42, which key is received in an appropriate groove or keyway 43. Secured to the main body portion 40 is a back plate 44 which is also part of the body 28, the back plate being held to the main body portion 40 by suitable fasteners 46. While only one of the fasteners 46 is shown, the fasteners may be equal in number to the number of sheave segments. The main body portion 40, adjacent the back plate 44, is provided with an annular groove 48, which groove receives an annular element 50. The annular element carries on one face scroll teeth 52. Since the element 50 carries scroll teeth 52 it is frequently referred to as a scroll or scroll element. In order to impart rotation to the scroll element 50 with respect to the body portion 40, gear teeth 54 are provided on the side of the scroll element 50 opposite the scroll teeth 52.

It should be noted at this point that the adjustable sheaves of this invention to a certain extent correspond to conventional chucks. In conventional chuck design the scroll 50 would be rotated by a key inserted within a suitable aperture in a skirt portion of the main body portion, the key carrying a pinion which is capable of engaging the teeth 54 to cause them to rotate relative to the body portion 40 to cause the jaws carried by the body portion of the chuck to move radially inwardly or outwardly. Such a design would not be practical in the continuously variable belt drive transmission of this invention as it is necessary to provide an alternate form of control means which is capable of moving the sheave segments 30 radially inwardly or outwardly while the body 28 is rotating wiht its respective shaft, for example 16 as shown in FIG. 3. To this end, the present invention contemplates the utilization of control means which includes the electric motor indicated by its output shaft 32, the motor 32 being mounted within a housing 56 which is mounted in any conventional manner on the back plate 44. In order to suitably power the electric motor the power transmitting means 34, which includes lines or conductors 57, extend from the source of power 36 to spaced apart commutator or slip rings 58, 60, which rings are mounted upon a stationary sleeve 62 which is suitably supported about the associated rotatable shaft (16 in FIG. 3) by bearings at either end, only one of the bearings 64 being shown in FIG. 3. It should also be noted that an exterior portion of the sleeve 62 is interconnected with an associated bearing block. The commutators 58 and 60 are in turn contacted by suitable brushes 66, 68, respectively, which brushes are mounted in any conventional manner on housing 58, the brushes in turn being in electrical contact by means of wires with the motor 32. The motor 32 is of the type whose rotational output can be strictly controlled by the input of electrical current, one such motor being commonly referred to as a stepping motor. While only two slip rings 58, 60 are shown, if desired, additional slip rings and brushes may be utilized. While the slip rings 58 and 60 are shown mounted upon a stationary sleeve 62 other designs may be utilized. Thus, the slip rings 58 and 60 may be mounted on the rotating shaft (for example 16) at a location adjacent one of the bearing blocks 14, the rings in turn being connected by brushes which are in electrical contact with the source of power 36 and control 38. The rings 58 and 60 will then be interconnected with the motor by suitable wires.

An output gear 70 is mounted on the output shaft 32 of the motor for rotation therewith, the output gear 70 meshing with an input gear 72 secured to shaft 74, which shaft 74 passes through suitable apertures in a skirt portion 76 of the main body portion 40 and through a flange 78 on the back plate 44. A pinion 80 is carried by the other end of the shaft 74 and engages the gear teeth 54 on scroll element 50. In order to properly position the shaft 74, input geat 72 and pinion gear 80, spacers 82, 84 may be disposed about the shaft 74.

Each of the radially adjustable sheave segments 30 include a base sheave portion 86 (FIG. 5) and a top sheave portion 88 (FIG. 6) which is secured to the base sheave portion by fasteners 90. The base sheave portion 86 includes a main body portion 91 which is provided on one side with teeth 92 which are engagable by the scroll 52. In addition, the main body portion 91 of the sheave base portion 86 is also provided with laterally outwardly extending ribs 94. The base sheave portion 86 is received within a radially outwardly extending slot 96 (FIG. 3) in the main body portion 40, the ribs 94 being received within grooves 98. When six sheave segments 30 are to be utilized the base portion 40 is provided with six radially outwardly extending slots, the base sheave portions being received therein.

The top sheave portion is to a certain extent U-shaped in cross-section and includes a bight portion 100, an attaching leg portion 102 and a supporting leg portion 104. The bight portion 100 is provided with suitable grooves 106 for reception of the drive belts 26. The attaching leg portion 102 is provided with a centering projection 1085 which not only helps to radially center the top sheave portion 88 when mounted on the base sheave portion 86 but also transmits some of the loading from the portion 88 to the base portion 86, so that not all of the loading is carried by the fasteners 90 in shear. Finally, the supporting leg portion 104 is provided with an extension or key 110 which is T-shaped in cross-section.

A support member 112 is disposed about the associated shaft (16 in FIG. 3) and is keyed thereto for rotation with the shaft by a key 114. The support member is provided with a number of radially outwardly extending slots 116 which are equal in number to the sheave segments 30, the slots 116 also being of a T-shape in cross-section and receiving the extension key 110 of the top sheave portion.

The operator control means 38 includes manually engagable means 118, which may be a knob mounted upon an electrical device such as a potentiometer 120. The manual control 118 and its associated electrical device 120 is in turn interconnected with a control module 122 by conductors 124. The control module 122 in turn may be a microprocessor based controller which, upon receipt of input signals will deliver specific output signals to each motor 32. In FIG. 1 separate controls are shown for each stage, there being a single manually engagable control 118 for the first stage, which control is linked with the control module 122. When the control module 122 receives a signal for the first stage, it will in turn cause the motor associated with the first adjustable sheave to be driven in one direction and the motor associated with the second adjustable sheave 24 to be driven in the opposite direction thereby increasing the effective diameter of the sheave segments 30 for one of the adjustable sheaves while decreasing the effective diameter for the other adjustable sheave. While separate controls for each stage is shown, it should be appreciated that a single controller may be utilized for all the stages, the individual potentiometers 120 in turn being coupled to a single signal processor and control module (not shown) which would in turn be coupled with the various motors of the adjustable sheaves for each stage to provide effective control.

While the continuously variable belt drive transmission of this invention may be used in various applications, its operation will be described below in connection with its utilization in a motor vehicle. Initially though it should be appreciated that when used in a motor vehicle the transmission will be associated not only with the output shaft of the motor engine and its drive shaft, but also with a gear box and clutch. Thus, in one typical situation the output shaft of the vehicle engine may be interconnected with the input shaft 16 by means of a clutch, and the output shaft 20 may be interconnected with the drive shaft of the vehicle by a speed reducing gear box. In operation, the operator will normally start the vehicle engine with the clutch depressed. If the variable speed transmission is not already in its low position, it will be shifted to its low position, the low position being illustrated in FIG. 1. After the clutch has been released it is only necessary to dial in the desired final speed. Assuming that the final speed is to be as fast as possible, then the control module 122 for each stage will cause the input adjustable sheave to be expanded to its full amount and the output adjustable sheave to be reduced in diameter to its smallest possible amount thereby providing the greatest speed increase from the transmission. While the control of the transmission has been stated to be operator controlled, it should be appreciated that other controls may be utilized. Thus, a microprocessor based control system may be utilized which will not only vary the output of the transmission but also vary the fueling of the engine so that either the most efficient performance of the engine or the maximum torque output can be achieved. Thus, if the engine can be run at its most fuel efficient speed while maintaining the desired ground speed, which may be detected in any conventional manner, an overall efficiency of operation may be achieved, while yet permitting high torque performance characteristics when desired, and also operator overrides, as when braking.

The proceeding specification described by way of illustration and not of limitation, a preferred embodiment of the invention. It is recognized that many other modifications of the disclosed embodiments will occur to those skilled in the art. Such modifications and equivalents are within the scope of this invention.

What is claimed is:

1. A continuously variable belt drive transmission having a support; laterally spaced apart first and second shafts journalled for rotation on the support; first and second adjustable sheaves mounted on the first and second shafts, respectively, the sheaves being in parallel alignment with each other, each of the sheaves including a body secured to the associated shaft for rotation therewith and a plurality of sheave segments mounted on the body for radial inward and outward movement; and a power transmitting belt extending between the first and second sheaves;

characterized by control means capable of selectively moving the segments radially inwardly or outwardly while the body is rotating with its associated shaft, the control means carried by the body of each of the first and second sheaves, the motor means being operatively interconnected with the associated sheave segments and capable upon actuation of moving the sheave segments radially inwardly or outwardly, and power transmitting means extending to the motor means about a portion of each of said shafts from a source of power external of the transmission.

2. The continuously variable belt drive transmission as set forth in claim 1 wherein the motor means is an electrical motor and the power transmitting means includes commutator rings and brushes.

3. The continuously variable belt drive transmission as set forth in claim 2 wherein the electric motor is a stepping motor.

4. The continuously variable belt drive transmission as set forth in claim 1 wherein the control means further includes an input signalling device responsive to external sensory input and a control module interconnected with the input signalling device and capable of producing suitable motor controls to cause the motor on the first adjustable sheave to be operated in one direction and the motor on the second adjustable sheave to be operated in the opposite direction so that one sheave will be expanded while the other is being reduced in diameter.

5. The continuously variable belt drive transmission as set forth in claim 1 further characterized by the provision of a support member for each of the first and second adjustable sheaves, the support member including a disk-like support element secured to the associated shaft for rotation therewith, the disk-like support element being provided with radially outwardly extending slots, and wherein each of the sheave segments includes an extension key disposed within said slot.

6. A continuously variable belt drive transmission having a support, laterally spaced apart first and second shafts journalled for rotation on the support, first and second adjustable sheaves mounted on the first and second shafts, respectively, the sheaves being in parallel alignment with each other, and each of the sheaves including a main body portion secured to its associated shaft for rotation therewith, a plurality of sheave segments mounted on the main body portion for radial inward and outward movement, each of the sheave segments being provided with teeth, a scroll journalled for rotation within the main body portion, the scroll being provided with scroll teeth engagable with the teeth on the sheave segments so that upon relative rotation of the scroll with respect to the main body portion the sheave segments will be moved radially inwardly or outwardly, and a power transmitting belt extending between the first and second sheaves;

characterized by control means capable of selectively moving the segments radially inwardly or outwardly while the main body portion is rotating with its associated shaft, the control means including electric motor means carried by the main body portion of each of the first and second sheaves, the electric motor means being operatively interconnected with the scroll element so that rotation of the electric motor will cause corresponding rotation of the scroll element so that the sheave segments can be moved radially inwardly or outwardly, commutator rings mounted about the rotatable shaft, brushes interconnecting the motor with the commutator rings, conductor lines interconnecting a control module with the commutator rings, the control module being interconnected with the electric motor means on both of the first and second adjustable sheaves, and input means associated with the control module.

7. The continuously variable belt drive transmission as set forth in claim 6 wherein the electric motor is a stepping motor.

8. The continuously variable belt drive transmission as set forth in claim 6 wherein the motor is interconnected with the scroll element by a spur gear mounted on the arbor shaft of the motor, a second spur gear in mesh with the first spur gear, the second spur gear being carried by a rotary shaft carried by the main body portion, and a pinion gear carried by the rotary shaft and in engagement with gear teeth on the scroll element.

* * * * *